(12) United States Patent
Glanfield et al.

(10) Patent No.: US 9,322,454 B2
(45) Date of Patent: Apr. 26, 2016

(54) PENDULUM VIBRATION ABSORBER

(71) Applicants: Ian S Glanfield, Amherstburg (CA); Bruce Geist, Sterling Heights, MI (US); John Bortell, Detroit, MI (US); Edward A Luibrand, Clarkston, MI (US)

(72) Inventors: Ian S Glanfield, Amherstburg (CA); Bruce Geist, Sterling Heights, MI (US); John Bortell, Detroit, MI (US); Edward A Luibrand, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 282 days.

(21) Appl. No.: 14/043,298

(22) Filed: Oct. 1, 2013

(65) Prior Publication Data

US 2015/0090073 A1  Apr. 2, 2015

(51) Int. Cl.

| | | |
|---|---|---|
| *F16C 3/04* | (2006.01) | |
| *F16F 15/28* | (2006.01) | |
| *F16C 3/06* | (2006.01) | |
| *F16F 15/12* | (2006.01) | |
| *F16F 15/14* | (2006.01) | |
| *F16F 15/26* | (2006.01) | |
| *F16C 3/20* | (2006.01) | |

(52) U.S. Cl.
CPC ............... *F16F 15/286* (2013.01); *F16C 3/06* (2013.01); *F16F 15/12* (2013.01); *F16F 15/1457* (2013.01); *F16F 15/26* (2013.01); *F16C 3/20* (2013.01); *F16C 2360/22* (2013.01); *Y10T 74/2184* (2015.01)

(58) Field of Classification Search
CPC ............ Y10T 74/2183; Y10T 74/2128; Y10T 74/2131; Y10T 74/2121; F16F 15/286; F16F 15/12; F16F 15/28; F16F 15/283; F16F 15/30; F16F 15/13128; F16C 3/06; F16C 3/20
See application file for complete search history.

(56) References Cited

U.S. PATENT DOCUMENTS

| | | | | |
|---|---|---|---|---|
| 2,332,072 | A | * 10/1943 | Gregory | ............... F16F 15/145 74/604 |
| 2,496,836 | A | 2/1950 | Williams | |
| 6,688,272 | B2 | 2/2004 | Brevick et al. | |
| 7,509,890 | B2 | 3/2009 | Cagney et al. | |
| 8,813,604 | B2 * | 8/2014 | Geist | ..................... F16F 15/145 123/192.2 |
| 2013/0098198 | A1 | 4/2013 | Geist et al. | |

\* cited by examiner

*Primary Examiner* — Richard W Ridley
*Assistant Examiner* — Yamilka Pinero Medina
(74) *Attorney, Agent, or Firm* — Ralph E. Smith

(57) ABSTRACT

A crankshaft can include a pendulum absorber and a retention arrangement. The pendulum absorber can include a carrier, a pendulum and a pin. The carrier can be coupled to a lobe and can have an opening. The pendulum can have an opening and the pin can be received in the openings to couple the pendulum to the carrier. The retention arrangement can include a retention flange and a retention pin. The retention flange can extend from the carrier or lobe. The retention pin can be coupled to the pendulum. The retention arrangement can maintain the retention pin in spaced relation to the retention surface during movement of the pendulum when the pin maintains the pendulum coupled to the carrier, and can retain the pendulum relative to the carrier through engagement of the retention pin and retention surface in an absence of the pin maintaining the pendulum coupled to the carrier.

19 Claims, 7 Drawing Sheets

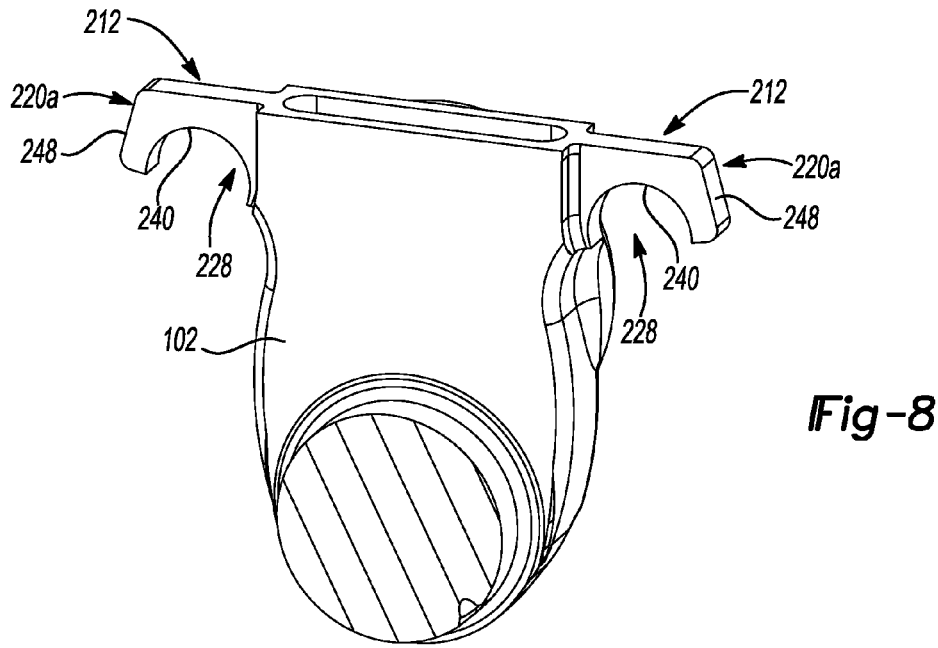
Fig-8
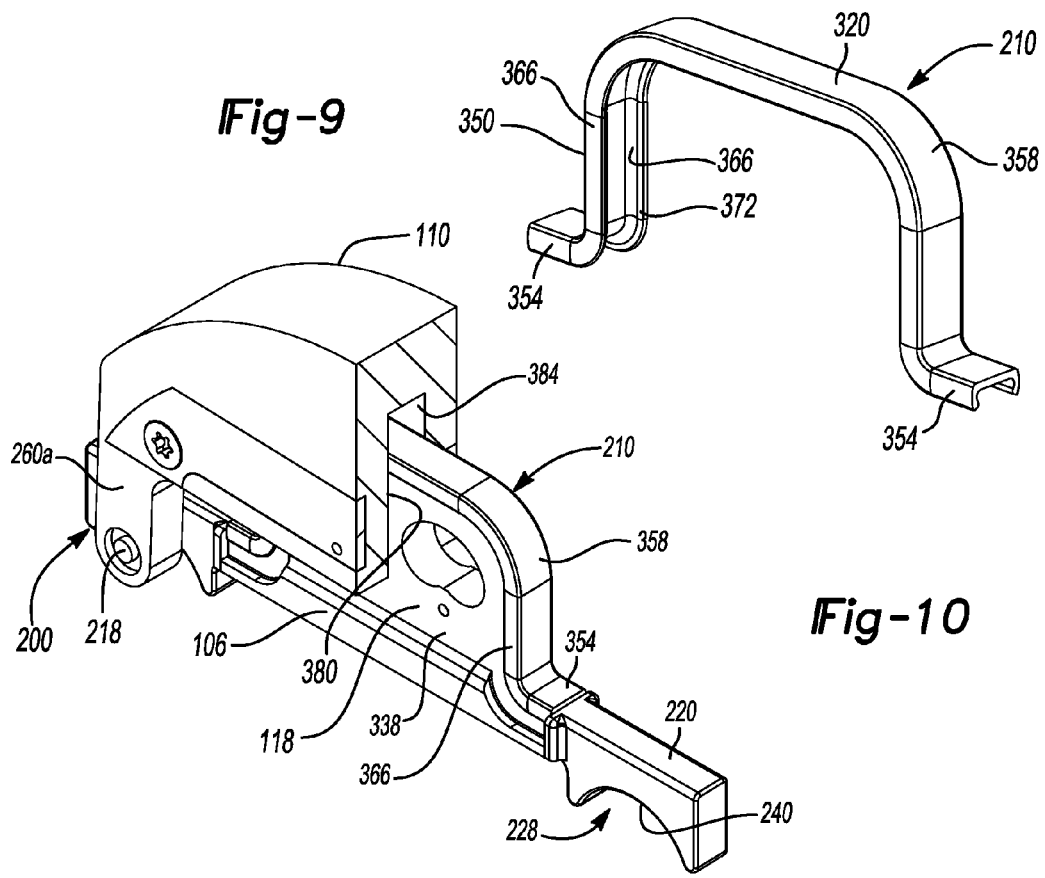
Fig-9
Fig-10

PENDULUM VIBRATION ABSORBER

FIELD

The present disclosure relates generally to a pendulum vibration absorber and, more particularly, to a pendulum vibration absorber having anti-rattle and secondary retention arrangements.

BACKGROUND

A crankshaft in a vehicle translates the reciprocating linear motion of an engine's pistons into rotational motion. In so doing, torsional vibrations are generated that can emanate through the vehicle. A four cycle engine with 8, 6, or 4 cylinders tends to produce (respectively) 4, 3 or 2 combustion pulse accelerations per engine revolution. These combustion pulses tend to accelerate the crank and driveline at a frequency that is a multiple of 4, 3 or 2 of the average rotational speed of the engine.

Vibrations generated as a result of these pulsations may be uncomfortable for the operator and/or passengers of the vehicle and are undesirable. Vibrations can be directly transferred to the passenger of the vehicle compartment when the torque converter is locked to increase the fuel efficiency of the vehicle. To reduce the vibrations, the driveline may have frequency tuned dampeners that counteract vibrations at certain frequencies. However, frequency tuned dampeners only operate at one frequency and do not reduce vibrations that occur at other frequencies.

Alternatively, a circular-path pendulum, with a properly calibrated swing radius, may be attached to the crankshaft at a calibrated distance from its center of rotation. This sort of pendulum can act to reduce torsional vibrations that occur at a frequency that is a specific order or multiple of average engine speed. One drawback of a circular-path pendulum, however, is that if the pendulum is overdriven, it may act as a torsional amplifier instead of as an absorber. This could result in increased powertrain vibrations that may cause damage to the vehicle and discomfort to the operator and passengers of the vehicle. Another drawback of the circular-path pendulum and/or other pendulum absorbers is the potential for the pendulum to contact the carrier, which could result in driver or occupant perceivable noise and/or vibrations. Therefore the inventors herein recognized a need for improvement in the relevant art.

SUMMARY

In one form, a crankshaft assembly for an internal combustion engine is provided in accordance with the teachings of the present disclosure. The crankshaft assembly can include a crankshaft having a lobe, a pendulum absorber coupled thereto and a secondary retention arrangement. The pendulum absorber can include a carrier, a pendulum and a primary pin. The carrier can be coupled to a body of the lobe and can have an opening therein. The pendulum can have an opening therein and the primary pin can be received in the carrier and pendulum openings to couple the pendulum to the carrier. The secondary retention arrangement can include a retention flange and a retention pin. The retention flange can extend from one of the carrier and the crankshaft lobe and can include a retention surface. The retention pin can be coupled to the pendulum. The secondary retention arrangement can be configured to maintain the retention pin in spaced relation to the retention surface during movement of the pendulum when the primary pin maintains the pendulum coupled to the carrier, and to retain the pendulum relative to the carrier through engagement of the retention pin with the retention surface in an absence of the primary pin maintaining the pendulum coupled to the carrier.

In another form, a crankshaft assembly for an internal combustion engine is provided in accordance with the teachings of the present disclosure. The crankshaft assembly can include a crankshaft having a lobe, a pendulum absorber coupled thereto, a secondary retention arrangement, and an anti-rattle member. The pendulum absorber can include a carrier, a pendulum and a primary pin. The carrier can be coupled to a body of the lobe and can have an opening therein. The pendulum can have an opening therein and the primary pin can be received in the carrier and pendulum openings to couple the pendulum to the carrier. The secondary retention arrangement can include a retention flange and a retention pin. The retention flange can extend from the carrier and can include a retention surface, and the retention pin can be coupled to the pendulum. The secondary retention arrangement can be configured to maintain the retention pin in spaced relation to the retention surface during movement of the pendulum when the primary pin maintains the pendulum coupled to the carrier, and to retain the pendulum relative to the carrier through engagement of the retention pin with the retention surface in an absence of the primary pin maintaining the pendulum coupled to the carrier. The anti-rattle member can be coupled to an upper perimeter of the carrier and can be configured to slidably engage the pendulum and maintain the pendulum in spaced relation to the carrier.

According to various embodiments, the pendulum can include first and second pairs of spaced apart retention arms extending from a bottom side thereof, and the retention flange can include first and second retention flanges positioned between the respective first and second pairs of retention arms. In various embodiments, the first and second retention flanges can be captured between the respective pairs of retention arms, the bottom side of the pendulum and the first and second retention pins coupled to the respective first and second pair of retention arms.

In accordance with various embodiments, the retention surfaces can include a notch formed in an uppermost location thereof, and the retention pins can include a projection on an uppermost side thereof configured to engage the notch in the absence of the primary pin maintaining the pendulum coupled to the carrier.

According to various embodiments, the pendulum can be slidably positioned in an opening defined by first and second inner walls of the carrier, and the anti-rattle can be configured to engage at least one of the first and second inner walls and maintain the pendulum in spaced relation to the carrier.

In accordance with various embodiments, the anti-rattle member can include a substantially U-shape in cross-section and can be configured to be positioned over an upper surface of the pendulum such that first and second legs of the anti-rattle member engage first and second opposed sides of the pendulum. In various implementations, the anti-rattle member can have a larger width than a width of the pendulum.

According to various embodiments, the pendulum can include at least one retention groove and the anti-rattle member can include at least one corresponding projection configured to engage the at least one retention groove. In various implementations, the anti-rattle member can include a polymeric anti-rattle member that can be injection molded onto the pendulum.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 8 is a view of a lobe of the crankshaft assembly illustrating an exemplary alternative secondary retention arrangement in accordance with the teachings of the present disclosure;

FIG. 9 is a perspective view of the anti-rattle member in accordance with the teachings of the present disclosure;

FIG. 10 is a partial sectional view of the exemplary torsional absorber illustrating the carrier with the anti-rattle arrangement positioned relative to the pendulum in accordance with the teachings of the present disclosure.

DESCRIPTION

Figure 1:
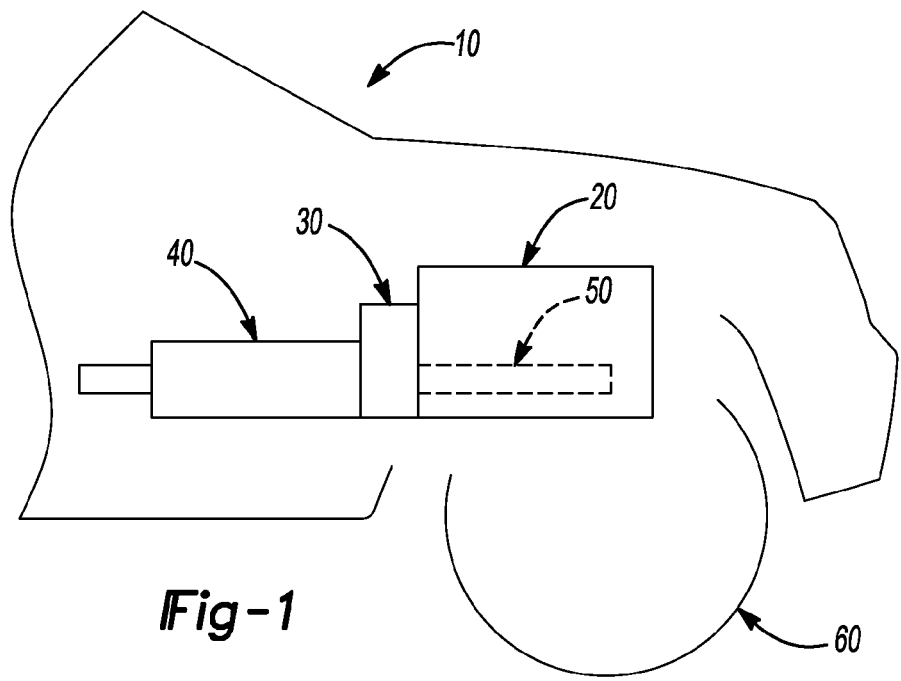
FIG. 1 schematically illustrates a vehicle with an internal combustion engine, a torque converter and a transmission in accordance with the teachings of the present disclosure.

FIG. 1 illustrates a vehicle 10 with an internal combustion engine 20, a torque converter 30, and a transmission 40 according to an exemplary embodiment. The engine 20 has a plurality of cylinders (not shown) formed therein. Each cylinder contains a piston (not shown) that reciprocates during operation of the engine 20. The pistons are mechanically coupled to a crankshaft assembly 50 via connecting rods. The crankshaft assembly 50 is mechanically coupled to the torque converter 30. The torque converter 30 transfers torque generated by the engine 20 to the transmission 40 to power the vehicle's wheels 60. It should be understood that FIG. 1 is a basic diagram of a vehicle 10 having an exemplary powertrain. Additional parts and other configurations may be implemented without diverging from the scope of this application.

In one exemplary embodiment, the crankshaft assembly 50 can include a torsional absorber having one or both of an anti-rattle arrangement and a secondary retention arrangement. In one exemplary embodiment, the torsional absorber can include a pendulum pivotably coupled to a carrier and configured to move in a predetermined path or manner relative to the carrier. As will be discussed in greater detail herein, the torsional absorber can include a secondary retention arrangement configured to maintain the coupled nature of the pendulum to the carrier should the primary mechanism for coupling the pendulum to the carrier no longer maintain such a coupling. In accordance with various embodiments, the torsional absorber can include an anti-rattle arrangement carried by the pendulum and configured to prevent a head portion of the pendulum from contacting the carrier during relative movement thereof.

Figure 2:
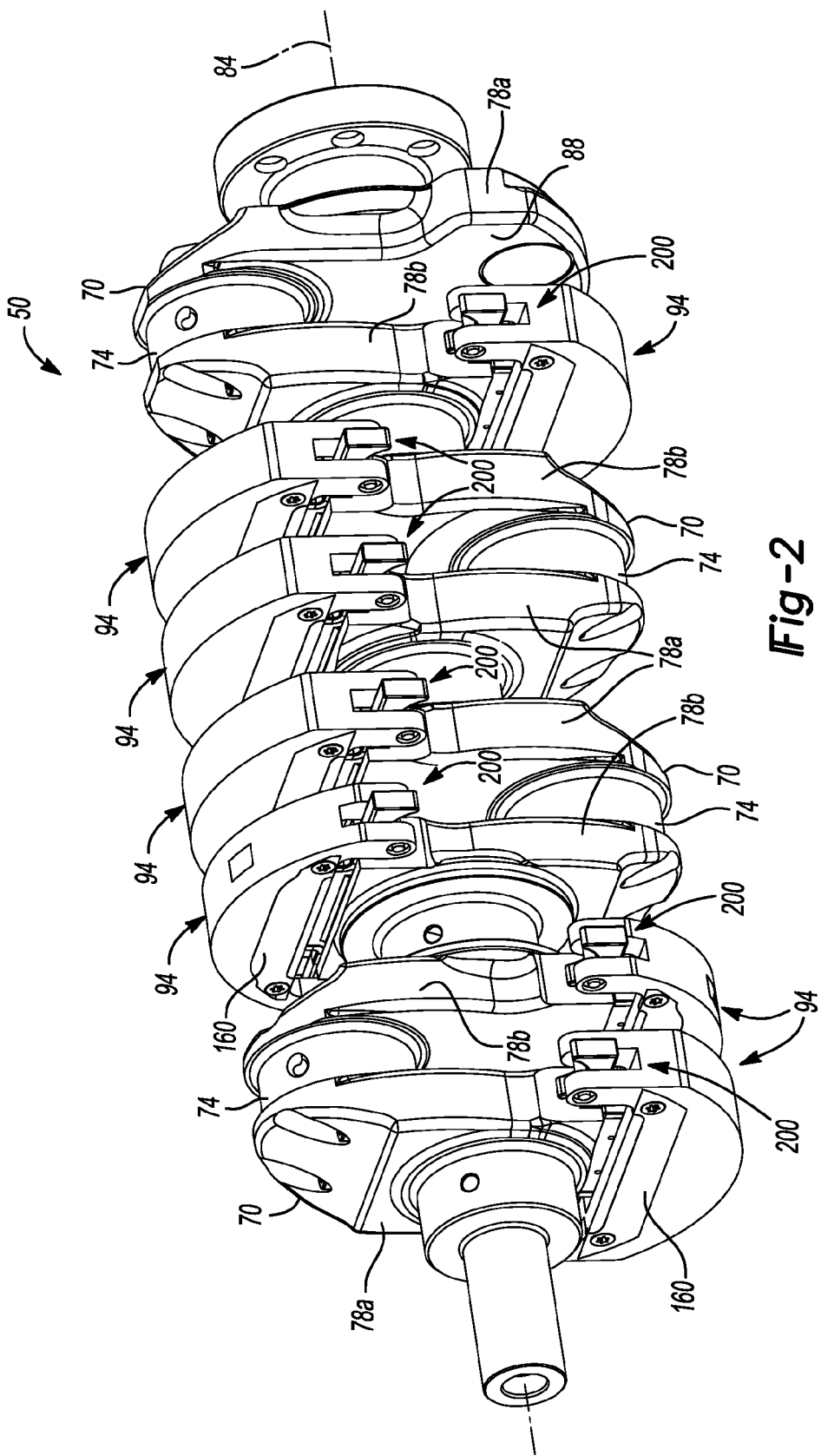
FIG. 2 is a perspective view of an exemplary crankshaft assembly in accordance with the teachings of the present disclosure.

FIG. 2 illustrates an exemplary embodiment of the crankshaft assembly 50 in further detail. The crankshaft assembly 50 can include four interconnected crank nodes 70. In another embodiment, the crankshaft 50 may have six or eight interconnected crank nodes 70. Each crank node 70 can include a crank pin 74 and first and second lobes 78a, 78b. Each lobe 78a, 78b can have an oval plate-like shape extending in a plane perpendicular to an axis of rotation or centerline 84 of the crankshaft 50. The center of each lobe 78a, 78b can be aligned near the axis of rotation 84. One end of each lobe 78a, 78b can be connected to the crank pin 74. The crank pin 74 can connect to a single piston in the engine 20 through a connecting rod (not shown). The crank pin 74 can allow a piston to rotate the crankshaft 50 along its axis of rotation 84.

In one exemplary embodiment, the first lobe 78a of each crank node 70 can contain a counterweight 88 on an end opposite the end connected to the crank pin 74. The counterweight 88 can balance the motion of the piston and connecting rod assemblies within the engine 20. The counterweights 88 can be integrally formed as part of the lobe 78a or they can be attached to the lobe 78a. Moreover, in another embodiment, first lobe 78a may not contain a counterweight 88.

In this exemplary embodiment, the second lobe 78b of each crank node 70 can contain a torsional absorber 94 on an end opposite the end connected to the crank pin 74. The torsional absorber 94 can reduce the torsional vibrations on the crankshaft 50 that occur from the forces applied to the crankshaft 50 by the engine 20 through the connecting rods. The torsional absorber 94 can also reduce torsional vibrations on the crankshaft 50 that occur when the torque converter 30 is locked to enhance the efficiency of the power transfer between the engine 20 and the transmission 40. Additionally, the torsional absorber 94 can act as a counterweight to balance the motion of the piston and connecting rod assemblies within the engine 20.

In the exemplary embodiment illustrated in FIG. 2 and various other figures, the first and second lobes 78a, 78b of three of the four crank nodes 70 can include torsional absorbers 94, and only lobe 78b of the fourth crank node 70 can include a torsional absorber 94 with the lobe 78a thereof having a counterweight 88. In another embodiment, only two of the four crank nodes 70 can contain torsional absorbers 94. In yet another embodiment, only one of the four crank nodes 70 can contain torsional absorbers 94. In still another embodiment, the crankshaft 50 can contain six crank nodes 70 and only two of the crank nodes 70 contain torsional absorbers 94. It should be understood that a varying number of crank nodes 70, counterweights 88, and torsional absorbers 94 can be implemented depending on the configuration of the engine 20 and the vehicle 10, and the amplitude and number of frequencies to be dampened.

Figure 3:
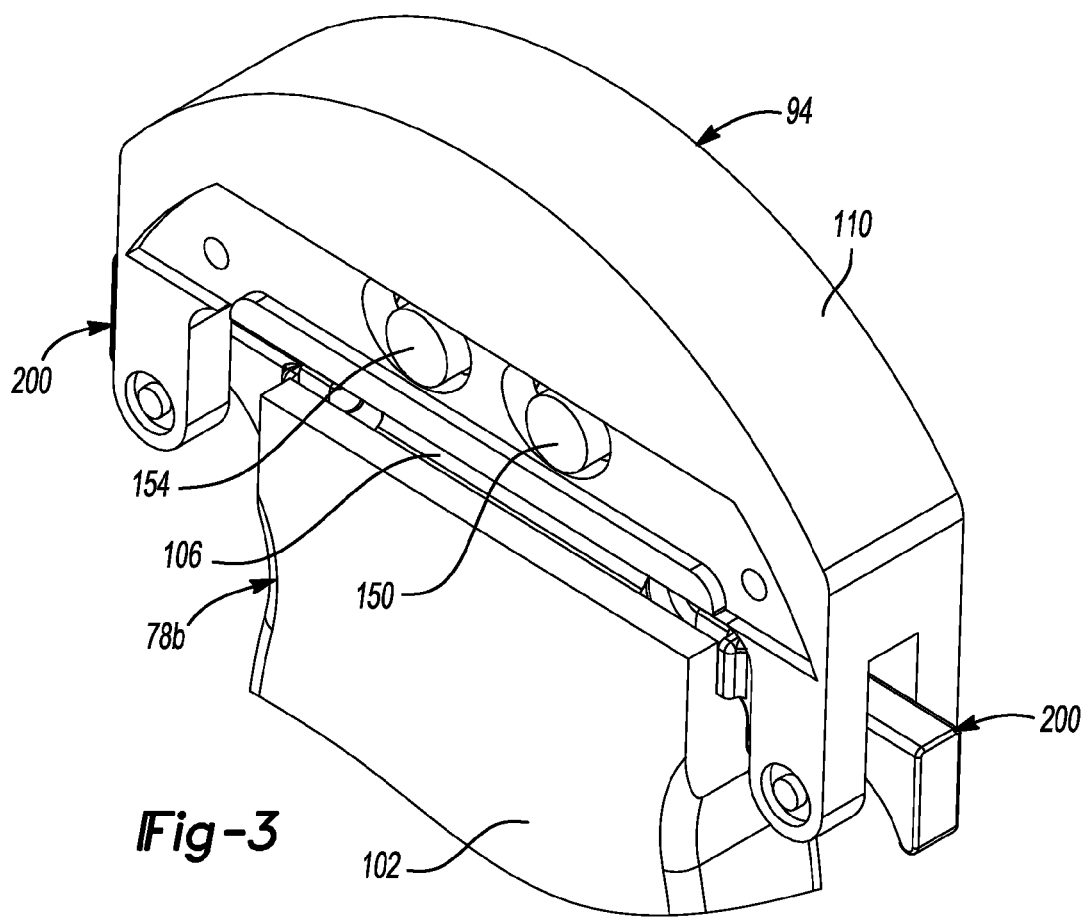
FIG. 3 is a perspective view of a lobe of the crankshaft of FIG. 2 having an exemplary torsional absorber with a retention arrangement in accordance with the teachings of the present disclosure.
Figure 4:
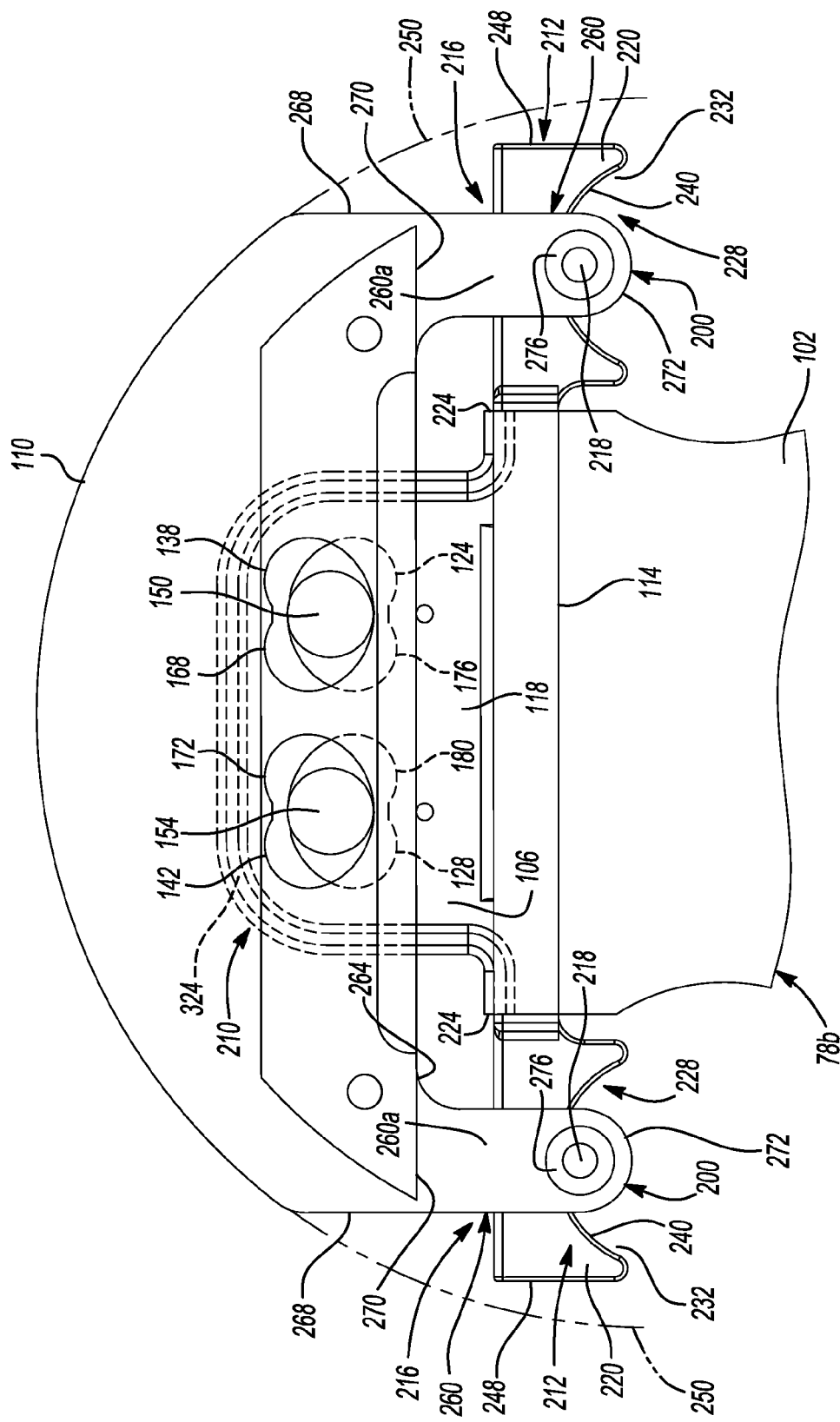
FIG. 4 is a front view of the lobe of FIG. 3 in accordance with the teachings of the present disclosure.
Figure 5:
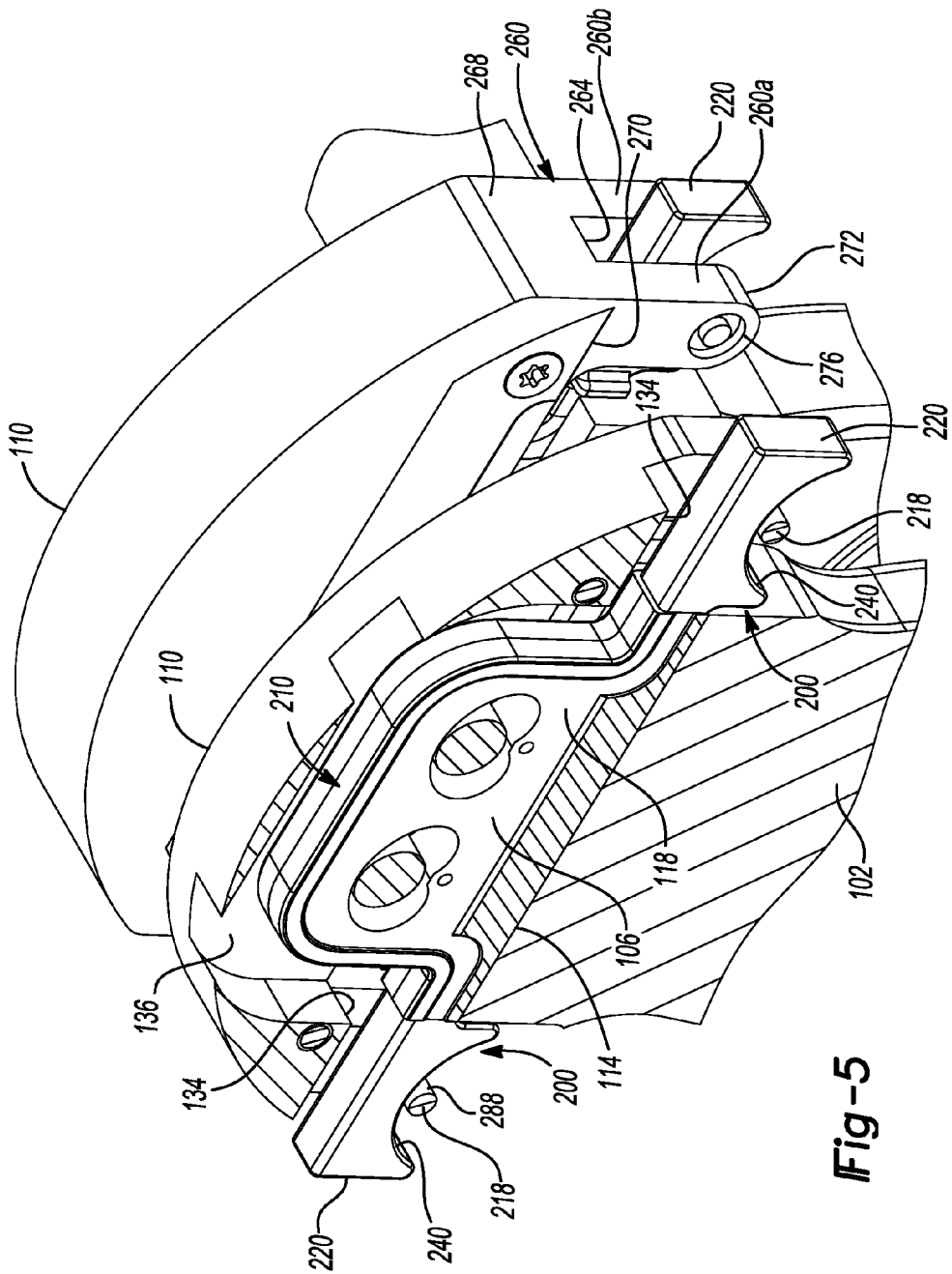
FIG. 5 is a view of the exemplary crankshaft illustrating a partial section view of a torsional absorber showing an anti-rattle arrangement and the secondary retention arrangement in accordance with the teachings of the present disclosure.
Figure 6:
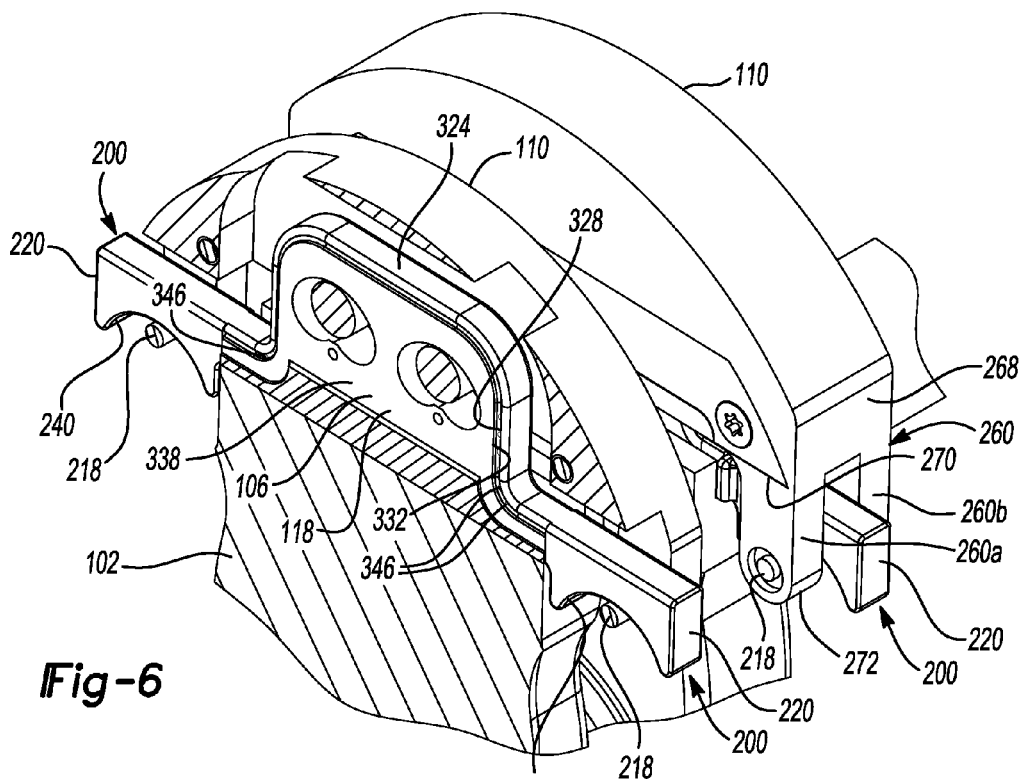
FIG. 6 is a view of an exemplary carrier with an anti-rattle member of the anti-rattle arrangement removed in accordance with the teachings of the present disclosure.

FIGS. 3-5 illustrate exemplary views of the lobe 78b with a torsional absorber 94 in accordance with an exemplary embodiment. The lobe 78b can include a body 102 that is coupled to the torsional absorber 94. The torsional absorber 94 can include a flange or carrier 106 that is coupled to the body 102 and a pendulum 110 that is pivotally coupled to the carrier 106. The carrier 106 can include an upper or head portion 118 that extends away from a lower end or side 114 configured to engage or be positioned adjacent an associated cam lobe. The head portion 118 can also include first and second openings 124, 128.

The pendulum 110 of the torsional absorber 94 can have a flange opening 134 and a hollow interior 136 (FIG. 5). The pendulum 110 can also have first and second openings 138, 142. The head portion 118 of the carrier 106 can pass through the flange opening 134 of the pendulum 110 and can reside in the pendulum's 110 hollow interior 136. The first flange opening 124 and the first pendulum opening 138 can be aligned so that a first circular pin 150 can pass through and reside within the openings 124, 138. Additionally, the second carrier opening 128 and the second pendulum opening 142 can be aligned so that a second circular pin 154 can pass through and reside within the openings 128, 142. The first and second pins 150, 154 can pivotally couple the pendulum 110 to the carrier 106 in a manner that provides the pendulum 110 with a limited range of free movement. Once the pins 150, 154 are positioned in their respective openings 124, 128, 138, 142, cover plates 160 (FIG. 2) can be attached to the sides of the pendulum 110 to secure the pins 150, 154 within the openings 124, 128, 138, 142. The cover plates 160 can be attached using a fastener, such as a bolt or screw, or an adhesive. Furthermore, one cover plate 160 may be attached to one side of pendulum 110 before the pins 150, 154 are placed in the openings 124, 128, 138, 142.

The pendulum 110 may be formed of a single material, such as, steel, tungsten, copper tungsten, tantalum, tungsten carbide, aluminum, and their alloys. The pendulum 110 may also be formed of one or more types of material. For example, the pendulum 110 may be formed of steel and have a tungsten or tantalum plug or multiple plugs to increase the mass of the pendulum 110. In another exemplary embodiment, it is desirable to position plugs of high density material in a secure manner to configure a pendulum whose center of mass is displaced away from the centerline axis of the powertrain revolution in a manner to dampen vibrations in the internal combustion engine. As another example, the pendulum 110 may be formed of aluminum and have steel or tungsten plugs to increase the mass of the pendulum 110.

Various materials, including heavy metals, may be used to increase the mass of the pendulum 110. An increase in pendulum mass without any corresponding change in pendulum size results in an increase in absorber inertia, defined as (pendulum mass)*$r^2$, where r is the distance from a center of rotation of the driveline to the center of mass of the pendulum 110. As increasing absorber inertia relative to the vehicle's powertrain inertia is desirable, efforts to increase the mass of pendulum 110 are also desirable. By using heavy or dense metals, the mass of the pendulum 110 may be increased without adding to packaging space requirements. Heavy metals include but are not limited to copper tungsten and tungsten carbide, for example.

FIG. 4 illustrates a front view of the lobe 78b of FIG. 3 in accordance with an exemplary embodiment. Each opening 124, 128, 138, 142 within the pendulum 110 and the carrier 106 can have a corresponding inner surface 168, 172, 176, 180. The inner surfaces 176, 180, 168, 172 can all have an identical epicycloidal configuration, but the orientation of the configurations are not identical. The epicycloidal inner surfaces 176, 180 of the openings 124, 128 of the carrier 106 are rotated 180 degrees with respect to the epicycloidal inner surfaces 168, 172 of the openings 138, 142 of the pendulum 110.

When the crankshaft 50 is rotating, centrifugal force can cause the pendulum 110 to extend away from the axis of rotation 84 of the crankshaft 50. When this happens, the pins 150, 154 can engage the inner surfaces 168, 172, 176, 180 as illustrated in FIG. 4. As the pendulum 110 moves, the first pin 150 can roll along the inner surface 168 of the first opening 138 of the pendulum 110 and the inner surface 176 of first opening 124 of the carrier 106 and the second pin 154 rolls along the inner surface 172 of the second opening 142 of the pendulum 110 and the inner surface 180 of the second opening 128 of the carrier 106. The rolling of the pins 150, 154 along their associated inner surfaces 168, 172, 176, 180 can cause the pendulum 110 to follow a precise epicycloidal path determined by the epicycloidal inner surfaces 168, 172, 176, 180. As a result, the pendulum 110 can be urged to operate at a resonant harmonic motion that corresponds and opposes vibrations of numerous frequencies generated by the engine 20 or torque converter 30. The opposing harmonic motion of the pendulum 110 reduces the vibrations transferred throughout the vehicle 10.

Because the epicycloidal path taken by the pendulum 110 is determined by the shape of the inner surfaces 168, 172, 176, 180, the path may be tuned to account for torsional fluctuations that typically occur at frequencies that are a definite multiple of average engine speed. For example, in one exemplary embodiment, the epicycloidal path may be tuned to allow the pendulum 110 to compensate for second order vibrations generated from a four-cylinder engine. A four cylinder engine typically has large second order torsional vibration components because there are two combustion events per rotation of the crank shaft. In another exemplary embodiment, the epicycloidal path may be adjusted to allow the pendulum 110 to compensate for fourth order vibrations generated from an eight-cylinder engine.

A pendulum of fixed geometry in a rotating field has a natural frequency that is proportional to the rotational speed. As a result, a large corrective dynamic response can occur whenever the pendulum is subjected to excitations of a specific multiple of average rotational speed. That is, a beneficial dynamic response occurs at multiples of mean rotation speed rather than at specific fixed target frequencies as in the case of a frequency tuned absorber. The natural frequency of the pendulum, and hence its corrective dynamic response to a target excitation order, tracks mean engine speed. For example, the target order (n), arising from combustion, for an 8 cylinder engine is 4 and for a 6 cylinder engine the target order is 3.

A family of prospective pendulum paths may be specified by defining the configuration of the inner surfaces 168, 172, 176, 180 according to Equation 1, as follows:

$$\rho^2 = \rho_0^2 - \lambda^2 S^2 \qquad \text{Equation 1.}$$

In Equation 1, $\rho_0$ is the radius of curvature of the path that corresponds to the pendulum apex (furthest point from the center of rotation), and S measures arc length distance along the pendulum path from this apex. When $\lambda=0$, curvature is constant, and the resulting path is a circle of radius $P_0$. When $\lambda=1$, the resulting curve is a cycloid. For $\lambda$ between 0 and 1, the resulting curve is an epicycloid. Thus, the epicycloidal path followed by the pendulum 110, as determined by the epicycloidal inner surfaces 168, 172, 176, 180, may be tuned so that the path more closely resembles a circle, a cycloid, or any epicycloid on a continuum there between. For example, in one exemplary embodiment, a specific λ between 0 and 1 may be chosen based on the excitation order to be corrected by the pendulum 110 that causes the pendulum's 110 tuning to be independent of its amplitude of oscillation. The tuning that generates this independent amplitude of oscillation is commonly referred to as tautochronic tuning. If the target order to be corrected is n, then the tautochronic λ is expressed by Equation 2, below.

$$\lambda = \lambda_e = \sqrt{\frac{n^2}{n^2+1}}. \quad \text{Equation 2}$$

When λ is chosen in this way (in accordance with Equation 2), the resulting tautochronic epicycloidal path maintains the tuning of the pendulum 110 regardless of the magnitude of its dynamic response to the excitation order.

In another exemplary embodiment, an epicycloidal path corresponding to λ chosen between the tautochronic value of $\lambda_e$ and 1 may be chosen for the pendulum 110. In this embodiment, at lower amplitudes of excitation, the tuning of the pendulum 110 remains nearly constant. As a result, lower to moderate torsional vibrations generated by the engine 20 may be corrected with high efficiency. However, as the pendulum response amplitude increases, which may happen when excitation levels get high, the pendulum tuning shifts away from the excitation frequency. This shift tends to mitigate the response of the pendulum 110. As a result, the pendulum 110 efficiently corrects low to moderate targeted excitation order vibrations but does not over-respond to higher excitations.

Further, the pendulum 110 avoids a saturated response where the pendulum 110 may potentially hit the body of the crankshaft 50. Thus, by traversing a properly chosen epicycloidal path where λ is chosen between $\lambda_e$ and 1, the pendulum 110 corrects vibrations of low to moderate amplitude levels to produce acceptable vehicle drivability, even when there is a hard coupling between engine 20 and transmission 40 (i.e., when the torque converter is locked). At higher levels of torsional vibration, the pendulum 110 still functions without hitting the body and hence without introducing objectionable vehicle noise due to this sort of impact.

It should be noted that at these higher levels of vibration, other less fuel efficient vibration control measures may be implemented, such as unlocking the transmission torque converter 30 to thereby produce a viscous coupling between engine 20 and the transmission 40. This viscous coupling of engine 20 to transmission 40 limits the vibration a driver or passenger feels within the vehicle. It is desirable to employ an apparatus that dampens the vibrations of a crankshaft that does not act as a vibrational amplifier, yet dampens vibrations at frequencies that are a specified multiple of engine rotation speed.

Unfortunately, unlocking the torque converter 30 can introduce inefficiencies, such as a decrease in fuel economy and other inefficiencies. An epicycloidal path where λ is chosen between $\lambda_e$ and 1, augments the possible excitation amplitudes the pendulum 110 can absorb without hitting the body 102. At the same time, such a path preserves the pendulum's 110 capability of correcting low to moderate amplitudes that would otherwise require inefficient torque converter 30 unlock calibrations. Furthermore, having the pendulum 110 traverse a properly chosen epicycloidal path prevents the pendulum 110 from becoming a vibration amplifier even when the amplitude of the excitation order becomes large.

In an exemplary embodiment for a predetermined vehicle and powertrain rotational inertia configuration, an acceptable threshold for vibration amplitudes of the crankshaft may be 0 to 2 degree peak to peak second order crank angle deviations. A configuration of a pendulum having a tautochronic epicycloidal path tuned as described herein may be utilized with the crankshaft to reduce approximately 50% of the second order vibrations.

In another exemplary embodiment, for a predetermined vehicle and powertrain rotational inertia configuration, an acceptable threshold for driveline vibration out of the engine and into the transmission might be 0 to 1 degree peak-to-peak second order crank angle deviations. If crank angle as a function of time may be expressed in radians as θ=ωt+a sin(nωt) where ω is the mean rotation speed in radians/second, then the order n degrees peak-to-peak measure p of oscillation is p=2a (180/Π). A pendulum configuration operating on the crankshaft of the engine that reduces the source order n vibration levels by 50% for pendulum swings induced by 0 to 2 degree peak-to-peak engine vibration amplitudes will reduce what would otherwise be 2 degree peak-to-peak oscillation amplitudes to below 1 degree peak-to-peak. If the pendulum configuration produced a tautochronic path (so that its tuning does not shift as pendulum amplitudes increases), the pendulum would tend to hit a motion pad sooner than a pendulum tuned away from a tautochronic path toward a cycloidal path. Pendulums tuned within a range of paths, not including substantially tautochronic paths but those toward cycloidal, can function within a larger range of vibration amplitudes without hitting the motion pad(s) to potentially cause powertrain noise. At the same time, the correction performance at lower amplitudes is nearly as good as substantially tautochronic path pendulums.

An additional advantage of the pendulum paths that are tuned towards cycloids is that the bifilar slots that create the pendulum hinges tend to be narrower, and therefore impose less of a packaging burden on the design. The carrier flange, for example, can be somewhat smaller because the motion slots in which the rollers move are smaller. Similarly, the mass of the pendulum can be slightly higher, because less mass must be subtracted from the pendulum blank to create the motions slots on the pendulum. A further discussion of the crankshaft 50 having the torsional absorber 94 discussed above can be found in U.S. application Ser. No. 13/277,443 filed on Oct. 20, 2011, the disclosure of which is incorporated by reference herein in its entirety.

With additional reference to FIGS. 5-11 and continuing reference to FIGS. 1-4, the secondary retention arrangement 200 and the anti-rattle arrangement 210 of the crankshaft assembly 50 will now be discussed in greater detail. As briefly discussed above, the secondary retention arrangement 200 can operate to maintain a coupled relationship between the pendulum 110 and the carrier 106 should the primary pivotable coupling pin or pins 150 no longer maintain the pivotable coupling of the components. In such an unlikely event, the secondary retention arrangement 200 can operate to prevent the pendulum 110 from separating from the carrier 106 and potentially damaging components of engine 20, especially during rotational movement of the crankshaft assembly 50.

In one exemplary implementation, the secondary retention arrangement 200 can include carrier retention members 212, pendulum retention members 216 and secondary retention pins 218. The carrier retention members 212 can include first and second laterally extending members or retention flanges 220 extending from first and second opposed ends 224 of carrier 106. In the exemplary implementation illustrated, the first and second retention flanges 220 can extend from the carrier 106 proximate the lower side 114. The first and second retention flanges 220 can each include a cut-out or clearance area 228 creating a void 232 for receipt of the secondary retention pin 218, as will be discussed in greater detail below. In one exemplary implementation, the clearance area 228 can include a semi-circular shaped cut-out into the retention flanges 220 having a semi-circular shaped upper wall or surface 240. It will be appreciated, however, that various different shapes for the cut-out or clearance area 228 can be utilized so long as the clearance area is dimensioned so as to not interfere with the normal travel of the pendulum 110 that is dictated by the pins 150, 154 and openings 124, 128, 138, 142.

The first and second retention flanges 220 can be positioned and dimensioned so as to not increase the radial clearance required by the torsional vibration absorber 94 during movement thereof. In particular, the outer ends 248 of the first and second retention flanges 220 can be dimensioned so as to not extend beyond a maximum radial length of the pendulum 110, as shown for example in FIG. 4 by phantom lines 250. The size of the cut-outs 228 in the first and second retention flanges 220 can also be sized and shaped to provide clearance for normal movement of pendulum 110 while also maintaining the pendulum 110 within a predetermined swing radius should the primary pins 150, 154 no longer couple the pendulum 110 to the carrier 106. This predetermined swing radius can be designed, for example, to ensure adequate clearance to adjacent engine components should the secondary retention arrangement 200 be relied upon to maintain the coupled nature of the pendulum 110 and carrier 106.

Figure 7:
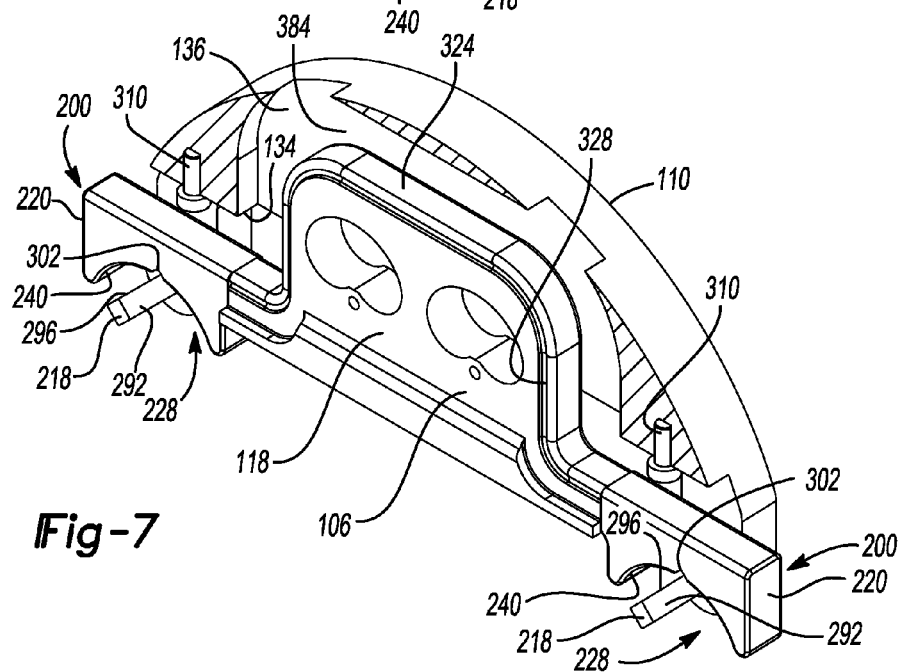
FIG. 7 is a partial sectional view of an exemplary torsional absorber illustrating an exemplary configuration of the secondary retention arrangement in accordance with the teachings of the present disclosure.

The pendulum retention members 216 can include, in one exemplary implementation, first and second pairs of retention arms 260 extending downward from a lower side 264 of pendulum 110. Each retention arm 260a, 260b of the first and second pairs of retention arms 260 can be spaced apart by an amount or a substantial amount of the flange opening 134 and hollow interior 136 of pendulum 110 (FIG. 7). In the exemplary implementation illustrated, the first and second pairs of retention arms 260 can form opposed truncated lateral sides 268 of pendulum 110. As can be seen in the various figures, the first and second pairs of retention arms 260 can slidably receive the first and second retention flanges 220. In particular, each pair of retention arms 260 can receive one of the retention flanges 220 between the spaced apart retention arms 260a, 260b, as shown for example in FIG. 5.

Each retention arm 260a, 260b of the first and second pairs of retention arms 260 can include a first or upper end 270 attached to the pendulum 110 and an opposed second or lower end 272. The pairs of retention arms 260 can be integrally formed with pendulum 110 or can be separate retention arms coupled or attached to pendulum 110. In one exemplary implementation, each retention arm 260a, 260b can include an aperture 276 proximate the lower end 272 that can receive the secondary retention pin 218, as shown for example in FIGS. 5 and 7. The secondary retention pins 218 can be separate pins coupled to the first and second pairs of retention arms 260 or can be integrally formed with one of the retention arms 260a, 260b and coupled to the other of the arms 260a, 260b. In the exemplary implementation illustrated in FIG. 5, the secondary retention pins 218 can include a circular shape 288 in cross-section and the inner wall 240 of the retention flange cut-out 228 can include a smooth or uninterrupted surface.

With particular reference to FIG. 7, one exemplary implementation of the secondary retention arrangement 200 can include secondary retention pins 218 having a diamond shape 292 in cross section. The diamond shape 292 can be orientated relative to the pendulum 110 and carrier 106 such that an exterior ridge or tip 296 of the pins 218 is orientated upward, as shown in FIG. 7. The inner wall 240 of the cut-out 228 can include a depression or notch 302 at a midpoint between opposed lateral ends of cut-out 228. In an event where the secondary retention arrangement 200 is relied upon to maintain the coupling of the pendulum 110 to the carrier 106, the ridge 296 and notch 302 can hold the pendulum 110 in a static position relative to the carrier 106.

FIG. 7 also illustrates an exemplary implementation including one or more elastomeric bumpers or stops 310. The bumpers 310 can be coupled to the lower side 264 of pendulum 110. In the exemplary implementation illustrated, the bumpers 310 can be positioned proximate the retention arms 260. In operation, the elastomeric bumpers 310 can be configured to prevent contact between the pendulum 110 and carrier 106 in an absence of centrifugal force and under a scenario where the secondary retention arrangement is being relied upon to maintain coupling of the carrier 106 to the pendulum 110.

In operation, the secondary retention arrangement 200 can provide secondary retention, to the extent required, while otherwise not interfering with the movement of the pendulum 110 relative to the carrier 106 as dictated, at least in part, by the primary pins 150, 154 and openings 124, 128, 138, 142. For example, the retention flange cut-outs 228 can be sized and shaped such that the secondary retention pins 218 do not contact the inner wall or retention surface 240 during movement of the pendulum 110 along the epicycloidal path discussed above. The cut-outs 228 can also be sized and shaped to cooperate with the secondary retention pins 218, to the extent required, to maintain a coupling of the pendulum 110 to the carrier 106 within a predetermined swing radius so as to not interfere or contact any adjacent engine components during rotation of the crankshaft assembly 50.

Turning now to FIG. 8, an exemplary alternative implementation of the carrier retention members 212 is generally shown at reference numeral 220a. The retention flanges 220a can be similar to the retention flanges 220 discussed above such that like reference numerals refer to like or corresponding features and only difference will be discussed in detail. The retention flanges 220a can be integrally formed with a lobe of crankshaft assembly 50 as opposed to being associated with carrier 106. The retention flanges 220a can otherwise operate in the same or similar fashion as flanges 220 discussed above and can optionally include notch 302 for use with pins 218 having the ridge 296.

With continued reference to FIGS. 5-11, the anti-rattle arrangement 210 will now be discussed. In one exemplary implementation, the anti-rattle arrangement 210 can include an anti-rattle body or member 320 associated with an upper outer perimeter 324 of carrier 106. In the exemplary configuration illustrated, the anti-rattle member 320 can be coupled to the upper outer perimeter 324 so as to extend entirely around the head portion 118. As will be discussed in greater detail below, the anti-rattle member 320 can be formed onto the carrier 106 or can be separately formed and assembled onto the carrier 106.

As will also be discussed in greater detail below, the anti-rattle member 320 can provide an elevated track for the pendulum 110 to slide on and relative to thereby preventing any metal to metal contact between the pendulum 110 and carrier 106, which could be objectionable to a driver and/or passenger of an associated vehicle. The anti-rattle member 320 can also provide a reduced contact surface area between the pendulum 110 and carrier 106 thereby reducing frictional losses during operation of the torsional vibration absorber 94 and thus increasing response of the system torsional inputs.

In one exemplary implementation, the upper outer perimeter 324 of the carrier 106 can include a groove profile 328 configured to couple or secure the anti-rattle member 320 to the carrier 106. In the exemplary implementation illustrated in FIGS. 6 and 11, the groove profile 328 can include first and second grooves or undercuts 332 formed in opposed front and rear sides 338, 342 of carrier 106 proximate the upper outer perimeter 324. In this exemplary implementation, the carrier groove profile 328 can form a male retention profile that corresponds to a complimentary female retention profile formed in the anti-rattle member 320.

The anti-rattle member 320 can be formed from any suitable material having a low coefficient of friction and being formable in various different configurations, including the general U-shape configuration of the upper outer perimeter 324. In one exemplary implementation, the anti-rattle member 320 can be formed from a low coefficient of friction polymeric material, such as a thermoplastic material. Examples of such a material include, but are not limited to, PolyEtherEtherKetone (PEEK), including unfilled and unreinforced PEEK and Nylon 46. In one exemplary implementation, the anti-rattle member 320 can be applied to the carrier 106 via an injection molding process. In this exemplary implementation, the carrier 106 can include optional apertures 346 (FIG. 6) positioned in an area (e.g., grooves 332) to be covered by the molded anti-rattle member 320 material so as to receive the material therein and aid in retention of the anti-rattle member 320. It will be appreciated, however, that the anti-rattle member 320 can also be separately formed and subsequently removably assembled to the carrier 106.

As discussed above, the anti-rattle member 320 can include an overall shape that conforms to the upper outer perimeter 324 of the carrier 106. In the exemplary configuration shown in FIG. 9, the anti-rattle member can include a substantially U-shaped configuration 350 with laterally extending leg member 354. The anti-rattle member 320 can also include a substantially U-shape 358 in cross section formed by an outer member 362 and first and second leg members 366. Each leg member 366 can extend inward toward a center of the U-shape 358 or include an internal rib or protrusion 372 configured to engage the grooves or undercuts 332 of groove profile 328 in carrier 106.

Figure 11:
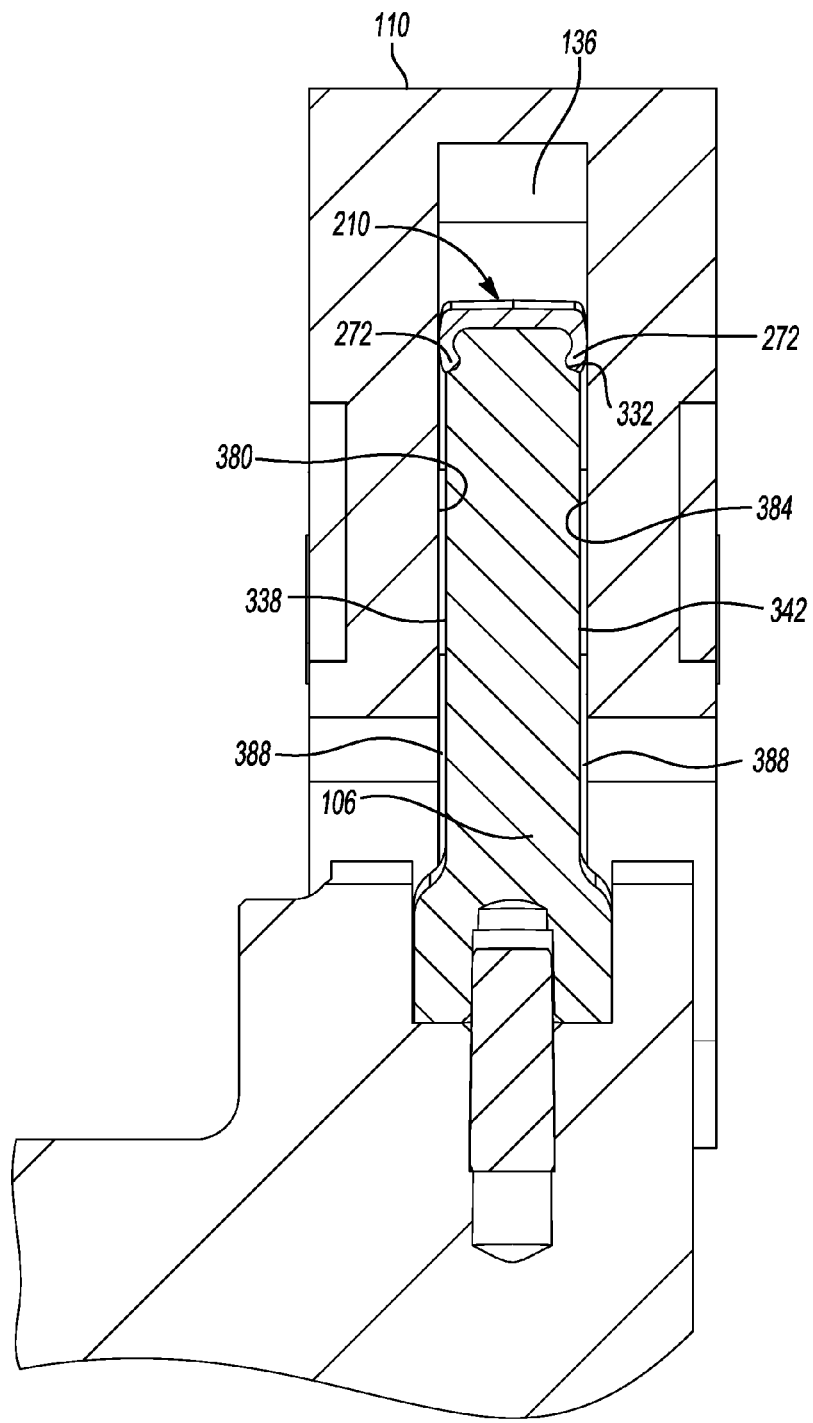
FIG. 11 is a partial sectional view of the crankshaft assembly illustrating carriers with the anti-rattle arrangement positioned relative to their respective pendulums in accordance with the teachings of the present disclosure.

The anti-rattle member 320 can include a larger width than the carrier 106 such that the anti-rattle member 320, when molded or coupled to the carrier 106, will maintain the front and rear sides 338, 342 of carrier 106 in spaced relation to inner walls 380, 384 of pendulum 110 that could otherwise contact carrier 106. In other words, when carrier 106 with anti-rattle member 320 molded thereto is received in pendulum hollow interior 136, the anti-rattle member 320 can maintain a clearance 388 between the sides 338, 342 of the carrier 106 and the corresponding inner walls 380, 384 of pendulum 110, as best shown in FIGS. 10 and 11. As discussed above, the anti-rattle member 320 can provide an elevated low coefficient of friction track for the pendulum 110 to slide on and move relative to the carrier 106 thereby preventing metal to metal contact of the pendulum 110 and carrier 106 and reducing frictional losses.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A crankshaft assembly for an internal combustion engine, comprising:
 a crankshaft having a lobe with a pendulum absorber coupled thereto, the pendulum absorber including:
  a carrier coupled to a body of the lobe and having an opening therein,
  a pendulum having an opening therein, and
  a primary pin received in the carrier and pendulum openings to couple the pendulum to the carrier; and
 a retention arrangement including:
  a retention flange extending from the carrier and including a retention surface;
  a pair of retention arms extending from the pendulum and spaced apart from each other along an axial direction of the crankshaft the retention flange being slidably positioned between the retention arms; and
  a retention pin coupled to the pair of retention arms;
  wherein the retention arrangement is configured to maintain the retention pin in spaced relation to the retention surface during movement of the pendulum when the primary pin maintains the pendulum coupled to the carrier, and to retain the pendulum relative to the carrier through engagement of the retention pin with the retention surface in an absence of the primary pin maintaining the pendulum coupled to the carrier.

2. The assembly of claim 1, wherein the pair of retention arms extend from a bottom of the pendulum toward a centerline of the crankshaft.

3. The assembly of claim 2, wherein the retention flange is captured between the pair of spaced apart retention arms, the bottom of the pendulum and the retention pin.

4. The assembly of claim 2, wherein the pair of retention arms includes a first pair of retention arms positioned at a first lateral side of the pendulum and a second pair of retention arms positioned at an opposed second lateral side of the pendulum, the retention flange including first and second retention flanges positioned between the respective pairs of retention arms and captured between the lower side of the pendulum and respective first and second retention pins.

5. The assembly of claim 4, wherein the retention surfaces include a semicircular shaped surface.

6. The assembly of claim 5, wherein the retention surface includes a notch formed in an uppermost location thereof, and wherein the retention pins include a projection on an uppermost side thereof configured to engage the notch in the absence of the primary pin maintaining the pendulum coupled to the carrier.

7. The assembly of claim 1, further comprising an elastomeric bumper coupled to a bottom of the pendulum and facing an upper side of the retention flange opposite the retention surface.

8. The assembly of claim 1, further comprising an anti-rattle body coupled to an upper perimeter of the carrier, the anti-rattle body configured to slidably engage the pendulum and maintain the pendulum in spaced relation to the carrier.

9. The assembly of claim 8, wherein the pendulum is slidably positioned in an opening defined by first and second inner walls of the carrier, the anti-rattle body configured to engage at least one of the first and second inner walls and maintain the pendulum in spaced relation to the first and second inner walls.

10. The assembly of claim 8, wherein the pendulum includes at least one retention groove and the anti-rattle body includes at least one corresponding projection configured to engage the at least one retention groove.

11. The assembly of claim 8, wherein the anti-rattle body includes a substantially U-shape in cross-section and is configured to be positioned over an upper surface of the pendulum such that first and second legs of the anti-rattle body engage first and second opposed sides of the pendulum, the anti-rattle body having a larger width than a width of the pendulum.

12. The assembly of claim 8, wherein the anti-rattle body comprises a polymeric anti-rattle body that is injection molded onto the pendulum.

13. The assembly of claim 8, wherein the anti-rattle body comprises a polymeric anti-rattle body that is injection molded onto the pendulum.

14. A crankshaft assembly for an internal combustion engine, comprising:
   a crankshaft having a lobe with a pendulum absorber coupled thereto, the pendulum absorber including:
      a carrier coupled to a body of the lobe and having an opening therein,
      a pendulum having an opening therein, and
      a primary pin received in the carrier and pendulum openings to couple the pendulum to the carrier;
   a retention arrangement including:
      a retention flange extending from the carrier and including a retention surface; and
      a retention pin coupled to the pendulum, wherein the retention arrangement is configured to maintain the retention pin in spaced relation to the retention surface during movement of the pendulum when the primary pin maintains the pendulum coupled to the carrier, and to retain the pendulum relative to the carrier through engagement of the retention pin with the retention surface in an absence of the primary pin maintaining the pendulum coupled to the carrier; and
   an anti-rattle body coupled to an upper perimeter of the carrier, the anti-rattle body configured to slidably engage the pendulum and maintain the pendulum in spaced relation to the carrier.

15. The assembly of claim 14, wherein the pendulum includes first and second pairs of spaced apart retention arms extending from a bottom side thereof, and wherein the retention flange includes first and second retention flanges positioned between the respective first and second pairs of retention arms.

16. The assembly of claim 15, wherein the first and second retention flanges are captured between the respective pairs of retention arms, the bottom side of the pendulum and first and second retention pins coupled to the respective first and second pairs of retention arms.

17. The assembly of claim 16, wherein retention surfaces of the first and second retention flanges each include a notch formed in an uppermost location thereof, and wherein the retention pins include a projection on an uppermost side thereof configured to engage the notch in the absence of the primary pin maintaining the pendulum coupled to the carrier.

18. The assembly of claim 15, wherein the pendulum is slidably positioned in an opening defined by first and second inner walls of the carrier, the anti-rattle body configured to engage at least one of the first and second inner walls and maintain the pendulum in spaced relation to the carrier.

19. The assembly of claim 18, wherein the anti-rattle body includes a substantially U-shape in cross-section and is configured to be positioned over an upper surface of the pendulum such that first and second legs of the anti-rattle body engage first and second opposed sides of the pendulum, the anti-rattle body having a larger width than a width of the pendulum.

* * * * *